United States Patent
Chen et al.

(10) Patent No.: US 7,864,428 B2
(45) Date of Patent: Jan. 4, 2011

(54) OPTICAL RECOGNITION DEVICE AND OPTICAL RECOGNITION DISPLAY COMPRISING THE SAME

(75) Inventors: Pei-Yu Chen, Hsinchu (TW); Sheng-Wen Cheng, Hsinchu (TW); Chen-Hsien Liao, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 514 days.

(21) Appl. No.: 12/038,185

(22) Filed: Feb. 27, 2008

(65) Prior Publication Data
US 2008/0273816 A1 Nov. 6, 2008

(30) Foreign Application Priority Data
May 1, 2007 (TW) .............................. 96115462 A

(51) Int. Cl.
*G02B 5/28* (2006.01)

(52) U.S. Cl. .................. 359/590; 359/359; 359/584

(58) Field of Classification Search .................. 359/359, 359/350, 577, 584, 586–590
See application file for complete search history.

(56) References Cited

U.S. PATENT DOCUMENTS

| 7,663,608 | B2 * | 2/2010 | Sui et al. ..................... 345/173 |
| 2002/0025441 | A1 * | 2/2002 | Hieda et al. ................. 428/440 |
| 2006/0071889 | A1 * | 4/2006 | Yang et al. .................... 345/87 |
| 2006/0139338 | A1 * | 6/2006 | Robrecht et al. ............ 345/175 |

* cited by examiner

*Primary Examiner*—Joshua L Pritchett
(74) *Attorney, Agent, or Firm*—Thomas, Kayden, Horstemeyer & Risley

(57) ABSTRACT

An optical recognition device is provided. The optical recognition device includes a transparent substrate, a patterned infrared reflective film formed thereon, and an infrared antireflective film sheltering a gap in a recognition pattern of the patterned infrared reflective film, wherein the patterned infrared reflective film reflects the recognition pattern by reflection of infrared light and transmission of visible light. The invention also provides a display incorporating the optical recognition device.

20 Claims, 5 Drawing Sheets

OPTICAL RECOGNITION DEVICE AND OPTICAL RECOGNITION DISPLAY COMPRISING THE SAME

BACKGROUND OF THE INVENTION

1. Field of the Invention

The invention relates to an optical device, and in particular, to an optical recognition device and an optical recognition display comprising the same.

2. Description of the Related Art

Conventional hand-writing input human-machine interfaces or display panels are divided into resistance-types, capacitance-types, inductance-types or optic-types, without requirement of an additional keyboard or other bulky input devices.

However, the accuracy of location and rapid hand-writing onto the human-machine interfaces cannot be achieved due to low resolution and long response time. Recently, many corporations have developed technology to combat the before mentioned deficiencies. For example, Wacom developed an electromagnetic-induced hand-writing input panel. However, the product has not get popular because of high cost. Conventional optical recognition devices are composed of multi-layered films formed by low-refraction films and high-refraction films. The multi-layered film allows transmission of visible light (400~700 nm), but reflects non-visible light with a specific wavelength (for example, infrared light (IR) region: 850~950 nm). The formed image is then captured by an image capture device to determine its location. However, undesirable reflected non-visible light may occur from reflections in the gap of the multi-layered film, and thus deteriorating optical recognition.

BRIEF SUMMARY OF THE INVENTION

An embodiment of the invention provides an optical recognition device comprising a transparent substrate, a patterned multi-layered film formed on the transparent substrate, and an anti-reflective optical film sheltering a gap in a recognition pattern of the patterned multi-layered film.

An embodiment of the invention provides an optical recognition device comprising a transparent substrate, an anti-reflective optical film formed on the transparent substrate, and a patterned multi-layered film formed on the anti-reflective optical film.

An embodiment of the invention provides an optical recognition device comprising a transparent substrate, an anti-reflective optical film formed on a first surface of the transparent substrate, and a patterned multi-layered film formed on a second surface of the transparent substrate.

An embodiment of the invention provides an optical recognition device comprising a transparent substrate, a patterned infrared reflective film formed on the transparent substrate, and an infrared anti-reflective film sheltering a gap in a recognition pattern of the patterned infrared reflective film, wherein the patterned infrared reflective film reflects the recognition pattern by reflection of infrared light and transmission of visible light.

An embodiment of the invention provides an optical recognition display comprising a display device for displaying a image having a transparent substrate and an optical recognition device comprising a patterned infrared reflective film formed on the transparent substrate and an infrared anti-reflective film sheltering a gap in a recognition pattern of the patterned infrared reflective film, wherein the patterned infrared reflective film reflects the recognition pattern by reflection of infrared light and transmission of visible light.

An embodiment of the invention provides an optical recognition display comprising a display panel having a transparent substrate, a patterned multi-layered film formed on the transparent substrate, and an anti-reflective optical film sheltering a gap in a recognition pattern of the patterned multi-layered film.

An embodiment of the invention provides an optical recognition display comprising a display panel having a transparent substrate, a polarizer formed on the transparent substrate, an anti-reflective optical film formed on the polarizer, and a patterned multi-layered film formed on the anti-reflective optical film.

An embodiment of the invention provides an optical recognition display comprising a display panel having a transparent substrate, an anti-reflective optical film formed on a first surface of the transparent substrate, a polarizer formed on a second surface of the transparent substrate, and a patterned multi-layered film formed on the polarizer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is determined by reference to the appended claims.

An embodiment of the invention provides an optical recognition device comprising a transparent substrate, a patterned multi-layered film such as a patterned infrared reflective film formed on the transparent substrate, and an antireflective optical film sheltering, i.e. shielding or covering, a gap in a recognition pattern of the patterned multi-layered film.

Figure 1:
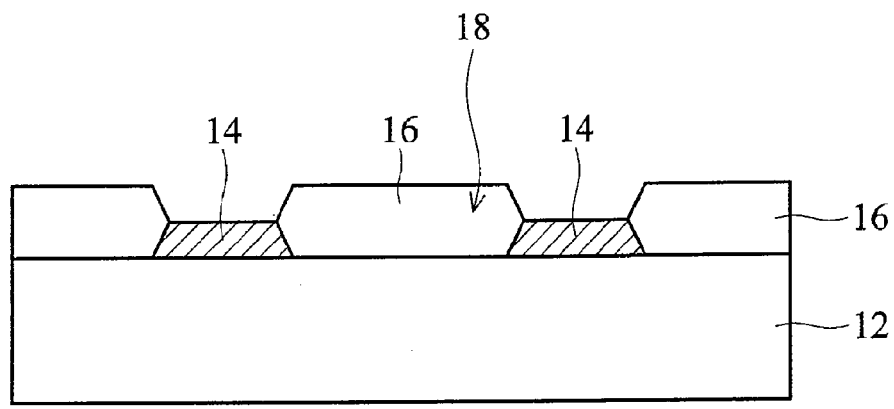
FIG. 1 is a cross sectional view of an optical recognition device in an embodiment of the invention.

A cross sectional view of an optical recognition device in an embodiment of the invention is shown in FIG. 1. The optical recognition device 10 comprises a transparent substrate 12, a patterned multi-layered film 14, such as a patterned infrared reflective film, and an anti-reflective optical film 16. The patterned multi-layered film 14 is formed on the transparent substrate 12. The patterned multi-layered film 14 reflects a recognition pattern by reflection of infrared light and transmission of visible light. The anti-reflective optical film 16 shelters, i.e. shields or covers, a gap 18 in the recognition pattern of the patterned multi-layered film 14. The gap 18 is an uncovered region or uncovered regions not covered by the patterned multi-layered film 14, such as the gap in the recognition pattern or between the recognition patterns. The anti-reflective optical film 16 can also shelters the gap 18 between the recognition patterns or any region without the recognition pattern. In other words, the anti-reflective optical film 16 shelters, covers or shields any uncovered region not covered by the patterned multi-layered film 14.

The transparent substrate 12 may be a glass substrate. The patterned multi-layered film 14 may be an infrared reflective film and comprise a plurality of low-refraction films such as silicon oxide ($SiO_2$) and a plurality of high-refraction films such as niobium oxide ($Nb_2O_5$), tantalum oxide ($Ta_2O_5$), and titanium oxide ($TiO_2$). The anti-reflective optical film 16 may be an anti-glare film or an anti-reflective film and comprise metal oxides or non-metal oxides, with a particle size of about 0.5~2 μm.

The anti-glare film or anti-reflective film is disposed in the gap of the patterned multi-layered film by, for example, lithography etching or screen printing coating to reduce reflected light or scattered light from the substrate in the gap of the multi-layered film. Thus, a large halo area or an ambiguous recognition pattern is prevented when the optical recognition device is utilized in various viewing angles.

An embodiment of the invention provides an optical recognition display comprising a display panel having a transparent substrate, a polarizer formed on the transparent substrate, a patterned multi-layered film formed on the polarizer, and an anti-reflective optical film sheltering gap in a recognition pattern of the patterned multi-layered film.

Figure 2:
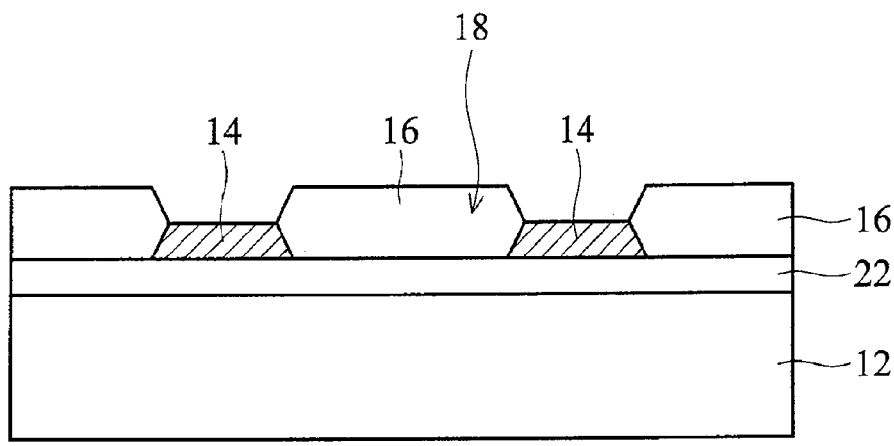
FIG. 2 is a cross sectional view of an optical recognition display in an embodiment of the invention.

A cross sectional view of an optical recognition display in an embodiment of the invention is shown in FIG. 2. The optical recognition display 20 comprises a transparent substrate 12, a polarizer 22, a patterned multi-layered film 14, and an anti-reflective optical film 16. The polarizer 22 is formed on the transparent substrate 12. The patterned multi-layered film 14 is formed on the polarizer 22. The anti-reflective optical film 16 shelters a gap 18 in the recognition pattern of the patterned multi-layered film 14.

An embodiment of the invention provides an optical recognitions display comprising a display device such as a liquid crystal display device having a transparent substrate, a patterned multi-layered film formed on the transparent substrate, an anti-reflective optical film sheltering a gap in a recognition pattern of the patterned multi-layered film, and a polarizer formed on the patterned multi-layered film and the anti-reflective optical film.

Figure 12:
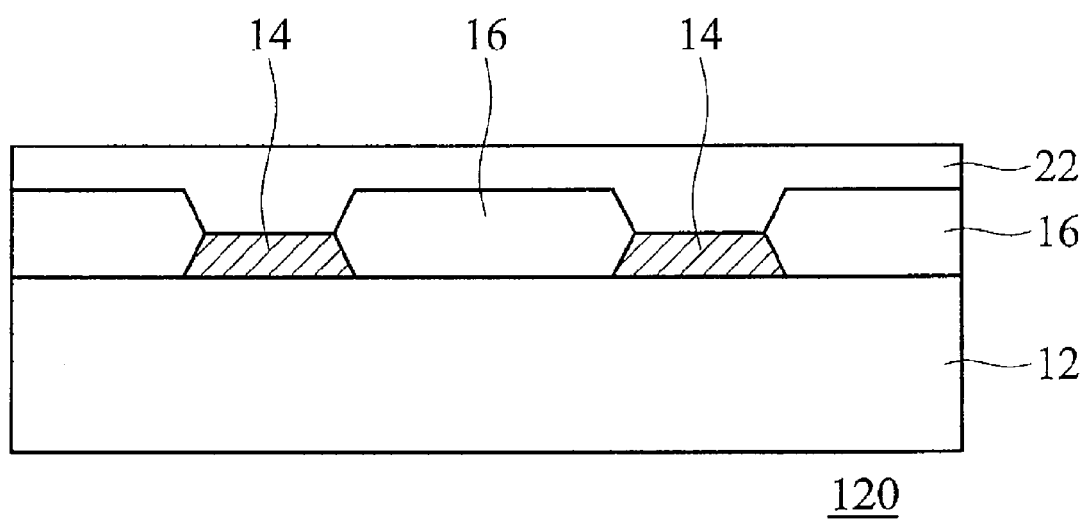
FIG. 12 is a cross sectional view of an optical recognition display in an embodiment of the invention.

A cross sectional view of an optical recognition display in an embodiment of the invention is shown in FIG. 12. The optical recognition display 120 comprises a transparent substrate 12, a patterned multi-layered film 14, an anti-reflective optical film 16, and a polarizer 22. The patterned multi-layered film 14 is formed on the transparent substrate 12. The anti-reflective optical film 16 shelters a gap in the recognition pattern of the patterned multi-layered film 14. The polarizer 22 is formed on the patterned multi-layered film 14 and the anti-reflective optical film 16.

An embodiment of the invention provides an optical recognition device comprising a transparent substrate, an anti-reflective optical film formed on the transparent substrate, and a patterned multi-layered film formed on the anti-reflective optical film.

Figure 3:
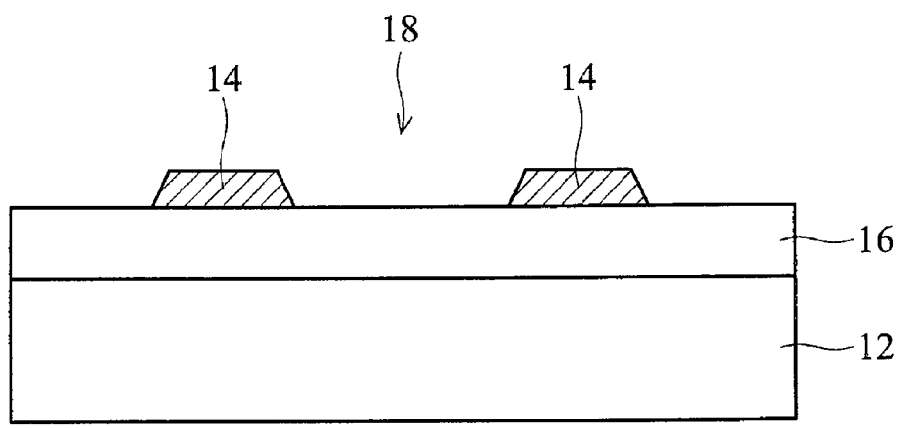
FIG. 3 is a cross sectional view of an optical recognition device in an embodiment of the invention.

A cross sectional view of an optical recognition device in an embodiment of the invention is shown in FIG. 3. The optical recognition device 30 comprises a transparent substrate 12, an anti-reflective optical film 16, and a patterned multi-layered film 14. The anti-reflective optical film 16 is formed on the transparent substrate 12. The patterned multi-layered film 14 is formed on the anti-reflective optical film 16.

The transparent substrate 12 may be a glass substrate. The anti-reflective optical film 16 may be an anti-glare film or an anti-reflective film and comprise metal oxides or non-metal oxides, with a particle size of about 0.5~2 μn. The patterned multi-layered film 14 is one kind of an infrared reflective film and comprises a plurality of low-refraction films such as silicon oxide ($SiO_2$) and a plurality of high-refraction films such as niobium oxide ($Nb_2O_5$), tantalum oxide ($Ta_2O_5$), and titanium oxide ($TiO_2$).

An embodiment of the invention provides an optical recognition display comprising a display device. The display device includes a display panel having a transparent substrate in the upper part of the display device, a polarizer formed on the transparent substrate, an anti-reflective optical film formed on the polarizer, and a patterned multi-layered film formed on the anti-reflective optical film.

Figure 4:
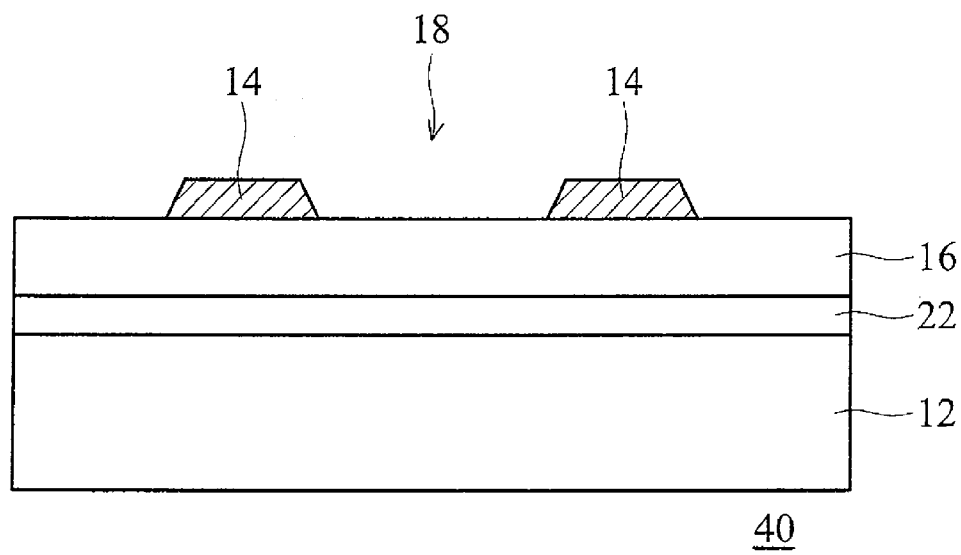
FIG. 4 is a cross sectional view of an optical recognition display in an embodiment of the invention.

A cross sectional view of an optical recognition display in an embodiment of the invention is shown in FIG. 4. The optical recognition display 40 comprises a transparent substrate 12, a polarizer 22, an anti-reflective optical film 16, and a patterned multi-layered film 14. The polarizer 22 is formed on the transparent substrate 12. The anti-reflective optical film 16 is formed on the polarizer 22. The patterned multi-layered film 14 is formed on the anti-reflective optical film 16.

An embodiment of the invention provides an optical recognition device comprising a transparent substrate, an anti-reflective optical film formed on a first surface of the transparent substrate, and a patterned multi-layered film formed on a second surface of the transparent substrate.

Figure 5:
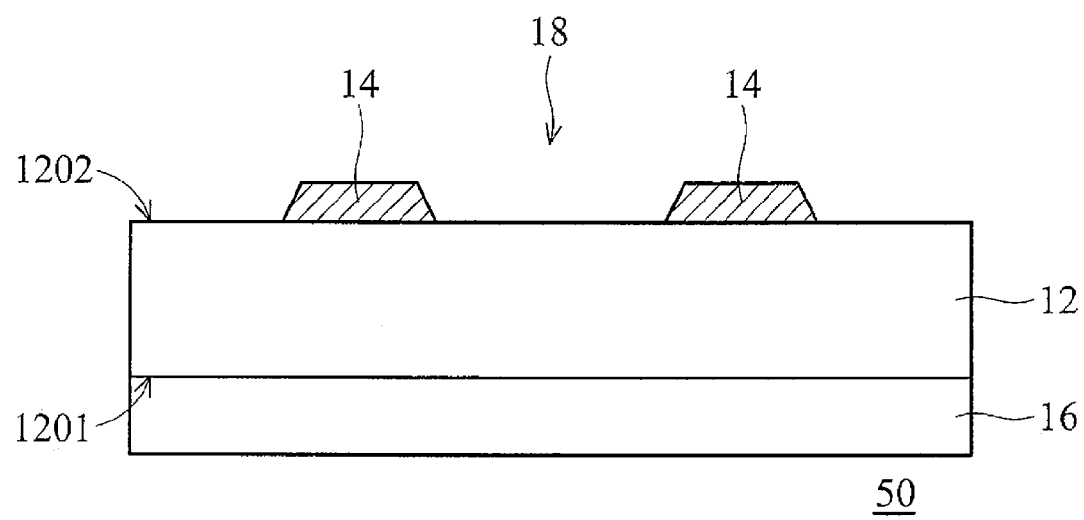
FIG. 5 is a cross sectional view of an optical recognition device in an embodiment of the invention.

A cross sectional view of an optical recognition device in an embodiment of the invention is shown in FIG. 5. The optical recognition device 50 comprises a transparent substrate 12, an anti-reflective optical film 16, and a patterned multi-layered film 14. The anti-reflective optical film 16 is formed on a first surface 1201 of the transparent substrate 12. The patterned multi-layered film 14 is formed on a second surface 1202 of the transparent substrate 12.

The transparent substrate 12 may be a glass substrate. The anti-reflective optical film 16 may be an anti-glare film or an anti-reflective film and comprise metal oxides or non-metal oxides, with a particle size of about 0.5~2 μm. The patterned multi-layered film 14 may be an infrared reflective film and comprise a plurality of low-refraction films such as silicon oxide ($SiO_2$) and a plurality of high-refraction films such as niobium oxide ($Nb_2O_5$), tantalum oxide ($Ta_2O_5$), and titanium oxide ($TiO_2$).

An embodiment of the invention provides an optical recognition display comprising a display panel having a transparent substrate, an anti-reflective optical film formed on a first surface of the transparent substrate, a polarizer formed on a second surface of the transparent substrate, and a patterned multi-layered film formed on the polarizer.

Figure 6:
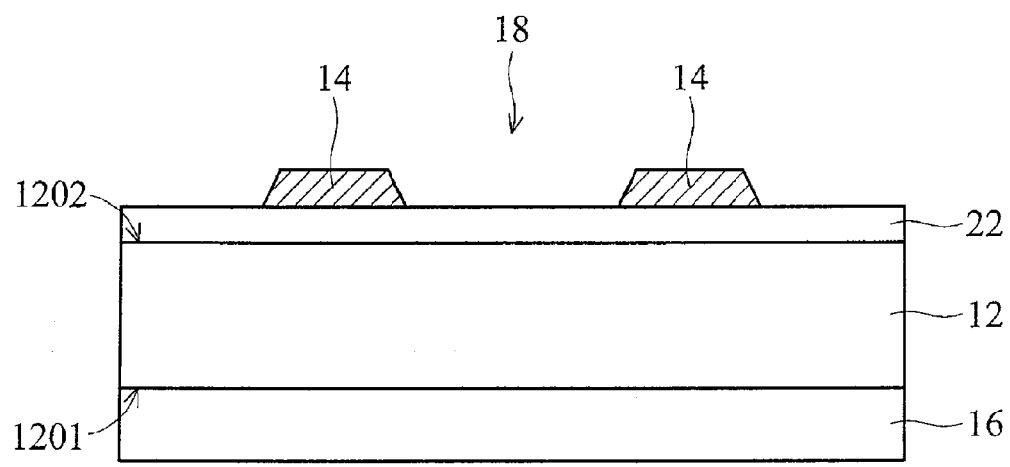
FIG. 6 is a cross sectional view of an optical recognition display in an embodiment of the invention.

A cross sectional view of an optical recognition display in an embodiment of the invention is shown in FIG. 6. The optical recognition display 60 comprises a transparent substrate 12, a polarizer 22, an anti-reflective optical film 16, and a patterned multi-layered film 14. The anti-reflective optical film 16 is formed on a first surface 1201 of the transparent substrate 12. The polarizer 22 is formed on a second surface 1202 of the transparent substrate 12. The patterned multi-layered film 14 is formed on the polarizer 22.

An embodiment of the invention provides an optical recognition device comprising a transparent substrate, a patterned infrared reflective film formed on the transparent substrate, and an infrared anti-reflective film sheltering a gap in a recognition pattern of the patterned infrared reflective film, wherein the patterned infrared reflective film reflects the recognition pattern by reflection of infrared light and transmission of visible light.

Figure 7:
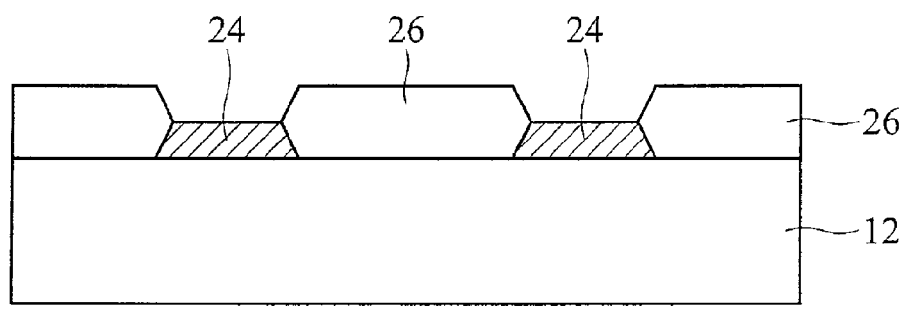
FIG. 7 is a cross sectional view of an optical recognition device in an embodiment of the invention.

A cross sectional view of an optical recognition device in an embodiment of the invention is shown in FIG. 7. The optical recognition device 70 comprises a transparent substrate 12, a patterned infrared reflective film 24, and an infrared anti-reflective film 26. The patterned infrared reflective film 24 is formed on the transparent substrate 12. The infrared anti-reflective film 26 shelters a gap in the recognition pattern of the patterned infrared reflective film 24.

The transparent substrate 12 may be a glass substrate. The patterned infrared reflective film 24 comprises a plurality of low-refraction films such as silicon oxide ($SiO_2$) and a plurality of high-refraction films such as niobium oxide ($Nb_2O_5$), tantalum oxide ($Ta_2O_5$), and titanium oxide ($TiO_2$). The infrared anti-reflective film 26 may be an anti-glare film or an anti-reflective film and comprise metal oxides or non-metal oxides, with a particle size of about 0.5~2 μm.

Figure 8:
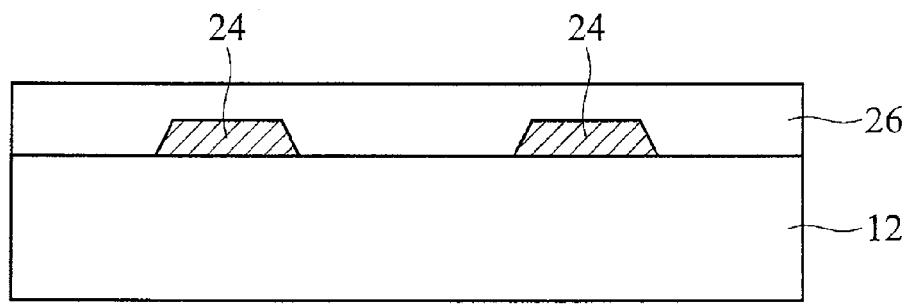
FIG. 8 is a cross sectional view of an optical recognition device in an embodiment of the invention.

A cross sectional view of an optical recognition device in an embodiment of the invention is shown in FIG. 8. The optical recognition device 80 comprises a transparent substrate 12, a patterned infrared reflective film 24, and an infrared anti-reflective film 26. The patterned infrared reflective film 24 is formed on the transparent substrate 12. The infrared anti-reflective film 26 is formed on the patterned infrared reflective film 24 and the transparent substrate 12.

Figure 9:
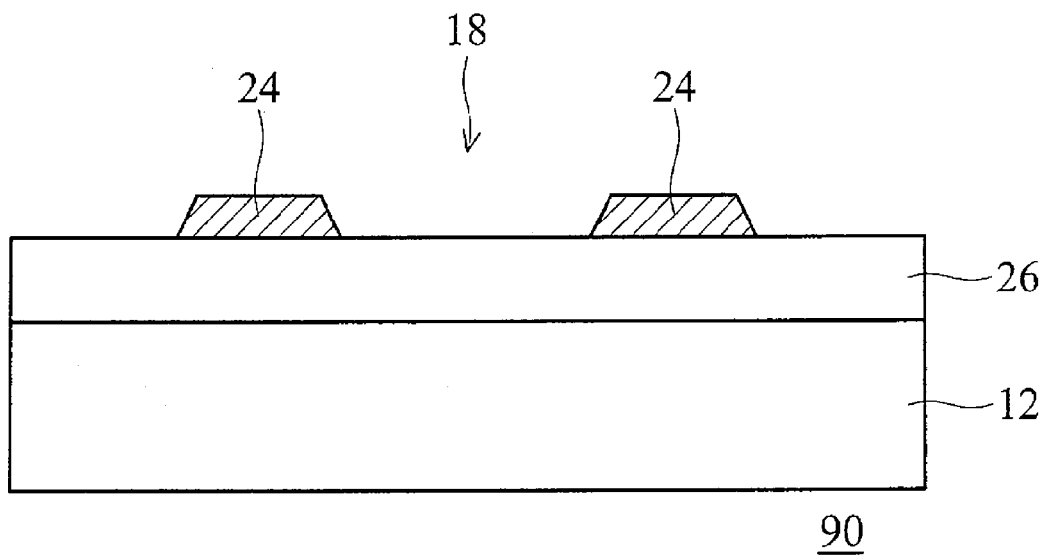
FIG. 9 is a cross sectional view of an optical recognition device in an embodiment of the invention.

A cross sectional view of an optical recognition device in an embodiment of the invention is shown in FIG. 9. The optical recognition device 90 comprises a transparent substrate 12, a patterned infrared reflective film 24, and an infrared anti-reflective film 26. The infrared anti-reflective film 26 is formed on the transparent substrate 12. The patterned infrared reflective film 24 is formed on the infrared anti-reflective film 26.

Figure 10:
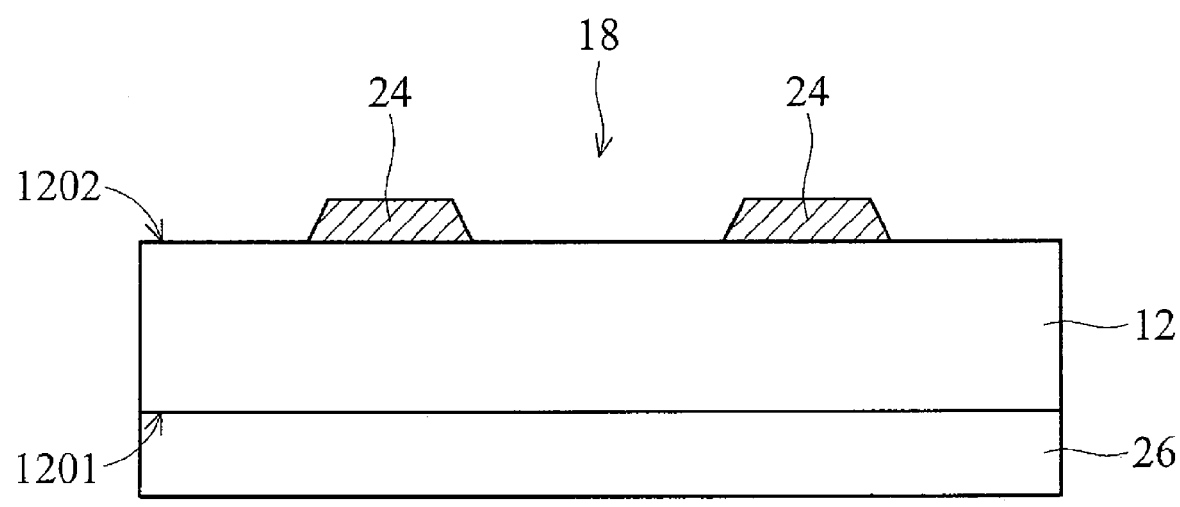
FIG. 10 is a cross sectional view of an optical recognition device in an embodiment of the invention.

A cross sectional view of an optical recognition device in an embodiment of the invention is shown in FIG. 10. The optical recognition device 100 comprises a transparent substrate 12, a patterned infrared reflective film 24, and an infrared anti-reflective film 26. The infrared anti-reflective film 26 is formed on a first surface 1201 of the transparent substrate 12. The patterned infrared reflective film 24 is formed on a second surface 1202 of the transparent substrate 12.

An embodiment of the invention provides an optical recognition display comprising a display device for displaying an image comprising a transparent substrate and an optical recognition device comprising a patterned infrared reflective film formed on the transparent substrate and an infrared anti-reflective film sheltering a gap in a recognition pattern of the patterned infrared reflective film, wherein the patterned infrared reflective film reflects the recognition pattern by reflection of infrared light and transmission of visible light.

Figure 11:
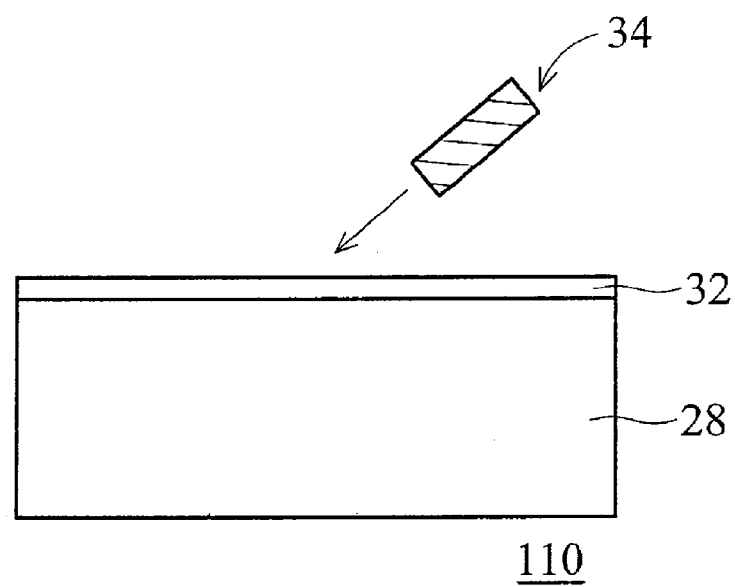
FIG. 11 is a cross sectional view of an optical recognition display in an embodiment of the invention.

A cross sectional view of an optical recognition display in an embodiment of the invention is shown in FIG. 11. The optical recognition display 110 comprises a display device 28, an optical recognition device 32, and an infrared recognition device 34 such as an infrared recognition pen with an infrared generating device and an infrared receiving device. The display device 28 comprises a transparent substrate (not shown). The optical recognition device 32 comprises a patterned infrared reflective film (not shown) and an infrared anti-reflective film (not shown). The exemplified structures of the patterned infrared reflective film and the infrared anti-reflective film are shown in FIGS. 7~10.

An embodiment of the invention provides a hand-writing input device suitable for use in various displays and capable of improving location accuracy and optical recognition.

While the invention has been described by way of example and in terms of preferred embodiment, it is to be understood that the invention is not limited thereto. To the contrary, it is intended to shelter various modifications and similar arrangements (as would be apparent to those skilled in the art). Therefore, the scope of the appended claims should be accorded the broadest interpretation so as to encompass all such modifications and similar arrangements.

What is claimed is:

1. An optical recognition device, comprising:
   a transparent substrate;
   a patterned multi-layered film formed on the transparent substrate and comprising a plurality of low-refraction films and a plurality of high-refraction films with a recognition pattern; and
   an anti-reflective optical film sheltering a gap in the recognition pattern of the patterned multi-layered film,
   wherein the anti-reflective optical film is formed in the gap of the recognition pattern of the patterned multi-layered film.

2. The optical recognition device as claimed in claim 1, wherein the transparent substrate is a glass substrate.

3. The optical recognition device as claimed in claim 1, wherein the low-refraction film comprises silicon oxide ($SiO_2$).

4. The optical recognition device as claimed in claim 1, wherein the high-refraction film comprises niobium oxide ($Nb_2O_5$), tantalum oxide ($Ta_2O_5$), or titanium oxide ($TiO_2$).

5. The optical recognition device as claimed in claim 1, wherein the anti-reflective optical film comprises an anti-glare film or an anti-reflective film.

6. The optical recognition device as claimed in claim 1, wherein the anti-reflective optical film comprises metal oxides or non-metal oxides.

7. The optical recognition device as claimed in claim 6, wherein the anti-reflective optical film has a particle size of metal oxides or non-metal oxides about 0.5~2 μm.

8. An optical recognition device, comprising:
   a transparent substrate;
   a patterned multi-layered film formed on the transparent substrate and comprising a plurality of low-refraction films and a plurality of high-refraction films with a recognition pattern; and
   an anti-reflective optical film sheltering a gap in the recognition pattern of the patterned multi-layered film,
   wherein the anti-reflective optical film is formed in the gap of the recognition pattern of the patterned multi-layered film.

9. The optical recognition device as claimed in claim 8, wherein the transparent substrate is a glass substrate.

10. The optical recognition device as claimed in claim 8, wherein the patterned infrared reflective film comprises a plurality of low-refraction films and a plurality of high-refraction films.

11. The optical recognition device as claimed in claim 10, wherein the low-refraction film comprises silicon oxide ($SiO_2$).

12. The optical recognition device as claimed in claim 10, wherein the high-refraction film comprises niobium oxide ($Nb_2O_5$), tantalum oxide ($Ta_2O_5$), or titanium oxide ($TiO_2$).

13. The optical recognition device as claimed in claim 8, wherein the infrared anti-reflective film comprises an anti-glare film.

14. The optical recognition device as claimed in claim 8, wherein the infrared anti-reflective film comprises metal oxides or non-metal oxides.

15. The optical recognition device as claimed in claim 14, wherein the infrared anti-reflective film has a particle size of metal oxides or non-metal oxides about 0.5~2 μm.

16. An optical recognition display, comprising:
  a display panel for displaying an image, wherein the display panel comprises a transparent substrate; and
  an optical recognition device, comprising:
  a patterned infrared reflective film formed on the transparent substrate, and the patterned infrared reflective film including a recognition pattern to reflect an infrared light and transmit a visible light; and
  an anti-reflective optical film sheltering a gap in the recognition pattern of the patterned infrared reflective film, wherein the anti-reflective optical film is formed in the gap of the recognition pattern of the patterned infrared reflective film.

17. The optical recognition display as claimed in claim 16, wherein the display device comprises a liquid crystal display device.

18. The optical recognition display as claimed in claim 17, further comprising a polarizer formed between the transparent substrate and patterned infrared reflective film.

19. The optical recognition display as claimed in claim 17, further comprising a polarizer formed on patterned infrared reflective film.

20. An optical recognition display, comprising:
  a display device for displaying an image, wherein the display device comprises a transparent substrate; and
  an optical recognition device comprising a patterned multi-layered film formed on the transparent substrate, the patterned multi-layered film comprising a plurality of low-refraction films and a plurality of high-refraction films with a recognition pattern to reflect an infrared light and transmit a visible light, and an anti-reflective optical film sheltering a gap in the recognition pattern of the patterned multi-layered film,
  wherein the anti-reflective optical film is formed in the gap of the recognition pattern of the patterned multi-layered film.

* * * * *